United States Patent [19]

Remmert

[11] 4,242,148
[45] Dec. 30, 1980

[54] THERMOCOUPLE SURFACE PROBE

[75] Inventor: Patrick A. Remmert, Denville, N.J.

[73] Assignee: Thermo Electric Co., Inc., Saddle Brook, N.J.

[21] Appl. No.: 63,384

[22] Filed: Aug. 3, 1979

[51] Int. Cl.³ .............................................. H01L 35/28
[52] U.S. Cl. .................................. 136/221; 73/359 R; 136/229
[58] Field of Search .............. 73/359 R; 136/221, 229

[56] References Cited
U.S. PATENT DOCUMENTS

| 2,279,846 | 4/1942 | Stapleton | 136/221 |
| 2,422,124 | 6/1947 | Obermaier | 136/229 X |
| 3,321,974 | 5/1967 | Sterbutzel | 136/221 X |
| 3,573,995 | 4/1971 | Senbokuya | 136/221 |

FOREIGN PATENT DOCUMENTS 554600 3/1958 Canada ...................................... 136/221

Primary Examiner—Leland A. Sebastian

[57] ABSTRACT

A thermocouple grill probe has a hollow fluorocarbon body that is solder filled for increased weight necessary to flatten a double bowed leaf spring mounted in a recess formed under the body by a depending peripheral skirt. A thermocouple junction is mounted to the leaf spring and is connected to a thermocouple connector by a pair of thermocouple wires. The probe is self-supporting and stands on the peripheral skirt which controls the deflection of the spring and protects the junction from circulating air currents.

10 Claims, 2 Drawing Figures

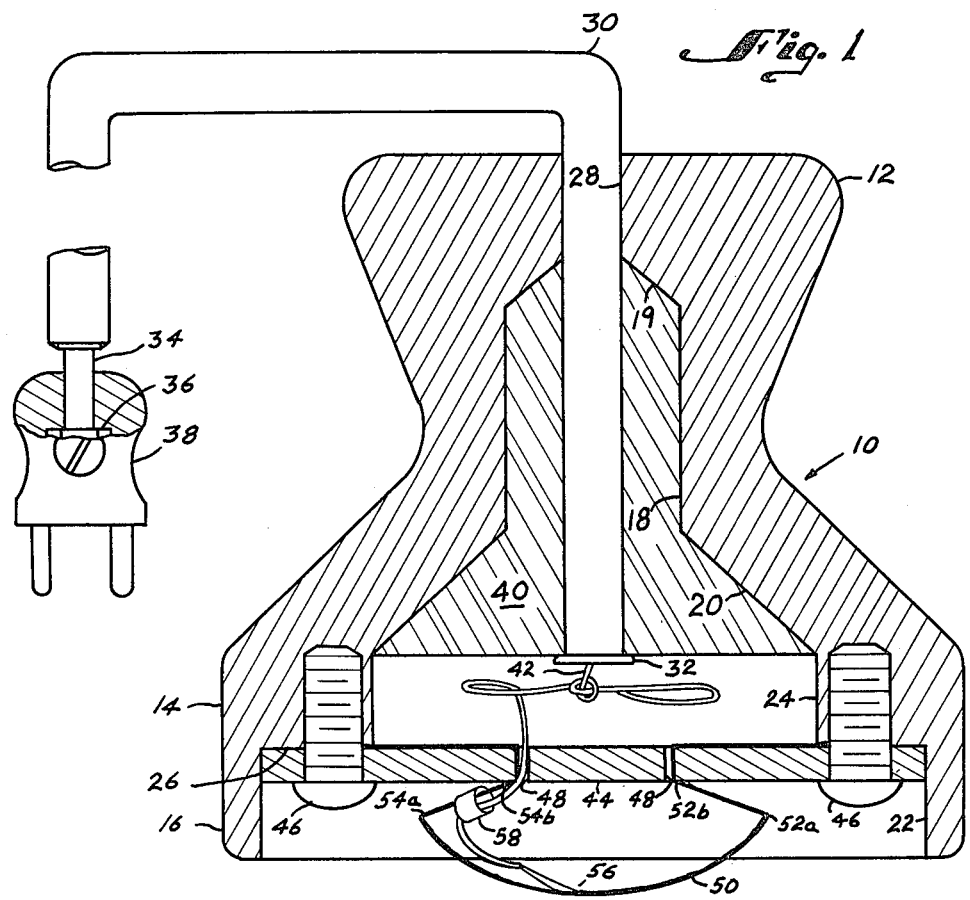
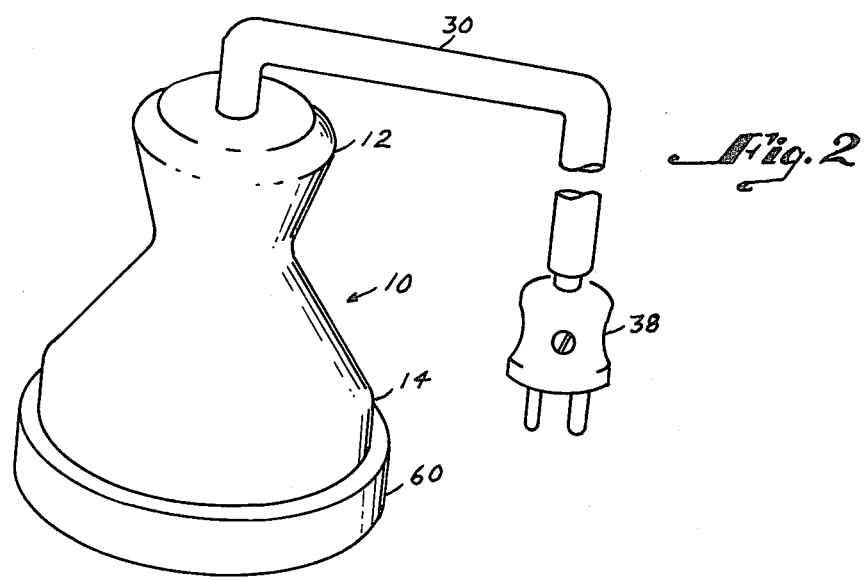

THERMOCOUPLE SURFACE PROBE

BACKGROUND OF THE INVENTION

1. Field of the Invention

This invention relates to thermocouple probes and more particularly to a thermocouple probe adapted for measuring the temperatures of surfaces particularly cooking grills.

2. Description of the Prior Art

In the food service industry and in particular in fast food restaurants, large surface area grills are used for preparing many types of foods. It has been determined that the grill temperature is very critical in the proper preparation of the different type foods; therefore, quality control requirements have been placed on the proper maintenance of grill surface temperatures. Thus, there was a need for a device that could be used to quickly and accurately determine the surface temperature of the grills.

Thermocouple probes have been used for measuring surface temperatures in sophisticated process devices where clean, smooth surfaces are available. However, developing a probe for a cooking grill presented certain unique problems. The probe had to be extremely portable and of such a design that it could be readily moved from one place to another on the grill and from one grill to the next. The device had to be such that it could be used by unskilled workers. Fast reading was required so that excessive time was not consumed in periodically checking the grill temperature. Since the measurements were to be made over a hot grill where fat could be splattering, the probe had to be designed to be lifted with a gloved hand. Due to the extreme heat over the grill, the probe had to be self-supporting so that the user could remove his hand while the reading was being taken. Most cooking grills have somewhat irregular surfaces due the presence of thin layers of residual food making good contact with the surface difficult and resulting in erroneous readings. Another difficulty that had to be contended with was the circulation of air caused by the close proximity of exhaust fans. The circulating air would quickly introduce errors into the temperature reading.

SUMMARY OF THE INVENTION

The present invention contemplates a weighted grill probe having a lead filled fluorocarbon body with a depending peripheral skirt defining a recessed bottom portion in which is mounted a stainless steel leaf spring. Thermocouple wire leads from a connector pass through an armored cable and the body to a thermocouple junction connected to the rear surface of the leaf spring. The leaf spring is rather stiff so that it is not deflected by residual food on the grill, but is flattened by that weighted lead filled body. The depending skirt controls the spring deflection and also protects the junction from the error introducing air circulation. The upper portion of the body is knob shaped so that it may be easily gripped by a gloved hand.

A primary objective of the invention is to provide a device for easily measuring the surface temperature of a cooking grill.

Another objective is to provide a thermocouple grill probe that is portable and may be gripped by a gloved hand.

Another objective is to provide a thermocouple grill probe that is self-supporting while making good contact with the grill surface.

Another objective is to provide a thermocouple grill probe that is protected from errors caused by circulating air.

These and other objectives and advantages of the invention will become apparent from the following description when taken in conjunction with accompanying drawings illustrating the invention. It will be understood, however, that the drawings are for purposes of illustration and are not to be construed as defining the scope or limits of the invention, reference being had for the latter purpose to the claims appended hereto.

DESCRIPTION OF THE DRAWINGS

FIG. 1 is a partial vertical section of the present invention.

FIG. 2 is a perspective view showing the invention with a protective cap.

DESCRIPTION OF THE INVENTION

Referring to FIG. 1 there is shown the grill probe of the present invention in partial vertical section. A body 10 formed of a heat resistant fluorocarbon material such as TEFLON has a knob shaped handle portion 12 and a base portion 14. The lower edge of base portion 14 forms an annular depending peripheral skirt 16 that defines a recessed bottom portion. Body 10 is generally circular and has a hollow center portion defined by inner surfaces 18, 19 and 20. An annular shoulder is formed between the surface 20 of the hollow center portion and the inner surface 22 of the depending skirt 16 by a cylindrical surface 24 and a flat surface 26. A bore 28 is formed through the center of the handle portion 12. TEFLON was chosen for the body because of its heat resistance and for the ease with which food material may be removed without sticking.

A flexible stainless steel armored cable 30 has one end extending through bore 28 to a point level with the intersection of surfaces 20 and 24 of the body 10 where the end is terminated by a rolled brass tube 32 extending into the cable and soldered thereto. The other end of the armored cable 30 is terminated by a brass transition piece 34 which also extends into the cable and is soldered thereto. Preferrably the cable is soldered with cadmium free silver solder for use in food service. A flanged end 36 of transition piece 34 is mounted in a thermocouple connector 38 having plugs formed of thermocouple material for insertion into a readout device.

The hollow center portion of the body is filled with solder 40 to add weight to the TEFLON body. The solder also functions to hold the armored cable 30 in place within the body.

KAPTON insulated thermocouple wire 42 having a pair of ISA-K thermocouple wires therein is connected to the plugs of connector 38 and extends through and out of the armored cable 30. The armored cable and KAPTON insulation are used to protect the thermocouple wires from the high grill temperatures that will be experienced.

A TEFLON base plate 44 is mounted to the shoulder surface 26 by a pair of button head screws 46 threaded into tapped holes formed in the body 10. Base plate 44 has a pair of apertures 48 formed therein through which pass the ends of a leaf spring 50. The thermocouple wire 42 is also passed through one of said apertures.

Leaf spring 50 is formed of stainless steel spring material with a pair of reversing bends 52a, 52b and 54a and 54b formed at each end. The unique use of two reversing bends provides for the use of more spring material in a limited space. Thus, there is a greater length of spring that may deflect to provide a higher spring force in the confined space of the recessed bottom portion. The ends of the spring that extend through apertures 48 are clamped between the base plate 44 and surface 26 of the shoulder.

The pair of thermocouple wires in wire 42 are silver soldered to the inner side of the middle of spring 50 to form a thermocouple junction 56 attached to spring 50. A piece of heat shrink tubing 58 is used to hold wire 42 in place along one leg of spring 50. Spring 50 is of such a length and shape that in its unflexed position it extends below the lower edge of skirt 16. The weight of body 10 and solder 40 is sufficient to flatten spring 50 when the body is placed on a flat surface such as a grill. The flattened spring makes a large area contact with the grill to quickly conduct heat to the thermocouple junction. The stiffness of the spring is such that small particles of food will not deflect the spring and lift it from the grill surface. Depending skirt 16 controls the deflection of spring 50 and also functions as a guard to block circulating air from reaching the junction 56 and causing an erroneous reading.

When the junction 56 is soldered to the spring, care must be taken to control the volume of solder used. A large mass of solder will decrease the rate of response by conducting heat away from the junction and will also interfere with the proper flexure of the spring.

The present invention uses spring material to make good surface contact as opposed to a leaf spring formed of thermocouple material which would not provide satisfactory large area contact or sufficient contact force. The weighted body flattens the spring by an amount controlled by the depth of skirt 16 which also guards the junction from error inducing air circulation. The body may be placed free standing on a grill surface while the temperature reading is taken and there is no need to continuously hold the device on the grill to make good contact. The knob shaped handle may easily be gripped by a gloved hand for relocation of the probe. The TEFLON body and base plate may be easily wiped clean after use without grease or food sticking thereto.

Referring to FIG. 2 there is shown the grill probe of the present invention having a vinyl cap 60 snapped over the base portion 14 to protect the spring 50 and the junction 56 when the probe is not in use.

I claim:

1. A thermocouple surface probe, comprising:
   a body including a handle portion and a depending peripheral skirt defining a recessed bottom portion;
   spring means mounted to said body in the recessed bottom portion;
   a thermocouple junction mounted to said spring means;
   a pair of thermocouple wires extending from said juntion; and
   a connector connected to said thermocouple wires, whereby the peripheral skirt controls the compression of the spring means and blocks circulating air from reaching the junction when the probe is placed on a surface for measuring the temperature thereof.

2. A thermocouple surface probe as defined in claim 1 additionally comprising means for increasing the weight of the probe to assure compression of the spring means and contact between the spring and the surface.

3. A thermocouple surface probe as defined in claim 2 wherein the means for increasing the weight comprises a heavy material disposed in a hollow portion of the body.

4. A thermocouple surface probe as defined in claim 1 wherein the spring means extends below the peripheral skirt when it is not compressed.

5. A thermocouple surface probe as defined in claim 1 wherein the spring means comprises a leaf spring formed of spring material.

6. A thermocouple surface probe as defined in claim 5 wherein the leaf spring is attached to the body at each end of the spring.

7. A thermocouple surface probe as defined in claim 6 wherein each end of the leaf spring has a pair of reversing bends formed therein.

8. A thermocouple surface probe as defined in claim 1 wherein the body is a heat resistant fluorocarbon.

9. A thermocouple surface probe as defined in claim 1 wherein the thermocouple wires pass through said body and are protected by an armored shielding.

10. A thermocouple surface probe as defined in claim 1, additionally comprising a cap for protecting the spring means and the junction when not in use.

* * * * *